(12) United States Patent
Ajichi et al.

(10) Patent No.: US 8,284,347 B2
(45) Date of Patent: *Oct. 9, 2012

(54) ILLUMINATION DEVICE, LIGHT EMITTING ELEMENT, AND LIQUID CRYSTAL DISPLAY DEVICE

(75) Inventors: Yuhsaku Ajichi, Nara (JP); Takeshi Masuda, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 527 days.

This patent is subject to a terminal disclaimer.

(21) Appl. No.: 12/304,026

(22) PCT Filed: May 9, 2007

(86) PCT No.: PCT/JP2007/059565

§ 371 (c)(1),
(2), (4) Date: Dec. 9, 2008

(87) PCT Pub. No.: WO2008/029540

PCT Pub. Date: Mar. 13, 2008

(65) Prior Publication Data

US 2010/0110330 A1    May 6, 2010

(30) Foreign Application Priority Data

Sep. 8, 2006  (JP) .................................. 2006-244784

(51) Int. Cl.
*G02F 1/1335* (2006.01)
(52) U.S. Cl. ........................................... 349/65; 349/62
(58) Field of Classification Search ............... 349/61–71
See application file for complete search history.

(56) References Cited

U.S. PATENT DOCUMENTS

| | | | | |
|---|---|---|---|---|
| 5,046,826 | A * | 9/1991 | Iwamoto et al. | 349/65 |
| 6,241,358 | B1 | 6/2001 | Higuchi et al. | |
| 6,700,633 | B2 * | 3/2004 | Cho | 349/65 |
| 2002/0043012 | A1 | 4/2002 | Shibata et al. | |
| 2002/0197051 | A1 | 12/2002 | Tamura et al. | |
| 2004/0022050 | A1 | 2/2004 | Yamashita et al. | |
| 2004/0183962 | A1 * | 9/2004 | Hua-Nan et al. | 349/64 |
| 2005/0117190 | A1 | 6/2005 | Iwauchi et al. | |

(Continued)

FOREIGN PATENT DOCUMENTS

CN    1860405    11/2006

(Continued)

OTHER PUBLICATIONS

U.S. Appl. No. 12/746,593, filed Jun. 7, 2010.

(Continued)

*Primary Examiner* — Dung T. Nguyen
(74) *Attorney, Agent, or Firm* — Nixon & Vanderhye P.C.

(57) ABSTRACT

A backlight (illumination device) according to the present invention includes a plurality of light sources, and a light guiding body for causing light emitted from the light sources to be emitted from a light emitting surface. The light sources are provided inside the light guiding body, and emit light in directions which are substantially parallel to a light emitting surface of the light guiding body. At least two of the plurality of light sources emit the light in directions which are different from each other. More specifically, at least two of the plurality of light sources are provided so as to face each other, and provided so that one of the plurality of light sources emits light toward the other one of the plurality of light sources, and vice versa.

16 Claims, 11 Drawing Sheets

U.S. PATENT DOCUMENTS

| | | |
|---|---|---|
| 2006/0002146 A1 | 1/2006 | Baba |
| 2006/0256255 A1 | 11/2006 | Minami |
| 2006/0262564 A1* | 11/2006 | Baba .................... 362/616 |
| 2006/0268568 A1 | 11/2006 | Oku et al. |
| 2008/0316770 A1 | 12/2008 | Oku et al. |
| 2009/0237593 A1 | 9/2009 | Hoshi |

FOREIGN PATENT DOCUMENTS

| | | |
|---|---|---|
| DE | 4 343 153 | 6/1995 |
| EP | 1 640 756 | 3/2006 |
| EP | 1 701 204 | 9/2006 |
| JP | 10-82915 | 3/1998 |
| JP | 10-133027 * | 5/1998 |
| JP | 11-288611 | 10/1999 |
| JP | 2001-250410 | 9/2001 |
| JP | 2001-291413 | 10/2001 |
| JP | 2002-108257 | 4/2002 |
| JP | 2002-208308 | 7/2002 |
| JP | 2004-186004 | 7/2004 |
| JP | 2004-227934 | 8/2004 |
| JP | 2005-56711 | 3/2005 |
| JP | 2005-157316 | 6/2005 |
| JP | 2006-19141 | 1/2006 |
| JP | 2006-39122 | 2/2006 |
| JP | 2006-302687 | 11/2006 |
| JP | 2009-093808 | 4/2009 |
| WO | WO 2006/107105 A1 | 10/2006 |

OTHER PUBLICATIONS

International Search Report for PCT/JP2007/059565, mailed Jun. 5, 2007.

* cited by examiner r = 0.0355mm
h = 0.01733mm

ILLUMINATION DEVICE, LIGHT EMITTING ELEMENT, AND LIQUID CRYSTAL DISPLAY DEVICE

This application is the U.S. national phase of International Application No. PCT/JP2007/059565, filed 9 May 2007, which designated the U.S. and claims priority to Japan Application No. 2006-244784, filed 8 Sep. 2006, the entire contents of each of which are hereby incorporated by reference.

TECHNICAL FIELD

The present invention relates to an illumination device used as a backlight of a liquid crystal display device, and to a liquid crystal display device including the illumination device.

BACKGROUND ART

Liquid crystal display devices have become rapidly popular in place of cathode ray tube (CRT) based display devices in recent years. The liquid crystal display devices have been in widespread use in liquid crystal televisions, monitors, mobile phones, and the like, which take advantage of energy saving, thin, lightweight features and other features of the liquid crystal display devices. One of ways to further take advantage of such features is to improve an illumination device (i.e. a backlight) which is provided behind a liquid crystal display device.

The illumination devices are roughly classified into a side light type (an edge light type) and a direct type. A side light illumination device is arranged so that a light guiding body is provided behind a liquid crystal display panel, and a light source is provided at an edge portion of the light guiding body. Light emitted from the light source is reflected by the light guiding body, so as to illuminate the liquid crystal display panel indirectly and evenly. This allows the illumination device (i) to be thin although low luminance is caused, and (ii) to realize provision of an illumination device superior in brightness uniformity. The side light illumination device therefore has been mainly adopted in small or medium sized liquid crystal display of electronic devices such as a mobile phone or a laptop computer.

An example of the side light illumination device is disclosed in Patent Document 1. Patent Document 1 discloses a surface emission device in which a plurality of dots are formed on a reflecting surface of a light guiding plate so that a light emitting surface emits light uniformly. In this surface emission device, corner regions of the reflecting surface become dark because light does not propagate toward the corner regions due to directivity of the light sources. For this reason, the dots are provided so that their density becomes higher in the corner regions than in the other regions.

A direct illumination device directly illuminates a liquid crystal display panel with the use of a plurality of light sources provided behind the liquid crystal display panel. As such, the direct illumination devices can easily realize high luminance even in a case of a big screen, and therefore have been applied mainly to 20 inch or larger liquid crystal displays. However, an existing direct illumination device is as thick as approximately 20 mm through 40 mm. This prevents the existing direct illumination device from becoming further thinner direct illumination device.

It is possible to realize a much thinner large liquid crystal display by reducing a distance between respective of light sources and a liquid crystal display panel. In this case, however, in order that the illumination device realizes brightness uniformity, it is necessary to increase the number of the light sources. Notwithstanding, an increase in the number of the light sources gives rise to an increase in cost. For this reason, it has been desired to develop a thin illumination device which is superior in brightness uniformity without an increase in the number of the light sources.

[Patent Document 1]
Japanese Unexamined Patent Publication No. 2003-43266 (Tokukai 2003-43266 (published on Feb. 13, 2003))
[Patent Document 2]
Japanese Unexamined Patent Publication No. 288611/1999 (Tokukaihei 11-288611 (published on Oct. 19, 1999))
[Patent Document 3]
Japanese Unexamined Patent Publication No. 82915/1998 (Tokukaihei 10-82915 (published on Mar. 31, 1998))

DISCLOSURE OF INVENTION

In view of the problems, it has been conventionally attempted to realize a thinner large liquid crystal display by providing a plurality of side light illumination devices.

For example, Patent Document 2 proposes a surface light source device which is suitable for use in a large liquid crystal display because it can cover a large light emitting area with its compact structure. The surface light source device has a tandem structure in which (i) light guiding blocks, each having a plate shape, are provided in a tandem manner so that primary light is directed to each of the light guiding blocks and (ii) primary light sources are provided to irradiate the light guiding blocks with first light, respectively.

However, in a case where linear light sources are used as light sources, like the surface light source device disclosed in Patent Document 2, the guiding bodies are provided so as to partially overlap each other when the light guiding blocks are provided in a tandem manner. It follows that the regions, where the guiding bodies partially overlap each other, have an increase in thickness, and thus the illumination device itself has an increase in thickness as well. Further, when the light guiding bodies are provided to partially overlap each other, like the surface light source device disclosed in Patent Document 2, each overlapping of the light guiding bodies causes an increase in weight of the illumination device.

Furthermore, the arrangement in which the light guiding bodies overlap each other causes the problems that (i) brightness uniformity cannot be secured in joint portions between adjacent two of the light guiding bodies, and (ii) it is necessary to carry out positioning of the light guiding bodies with high accuracy.

Moreover, Patent Document 3 discloses a surface light source device in which a light guiding body has concave portions where light sources are provided, respectively. This surface emission device uniforms a luminance distribution by an arrangement in which each of the concave portions has a cone shape to reduce an amount of light emitted forward along an axis of the each of the concave portions. The surface emission device, however, still cannot fully uniform luminance, because the light sources are provided so that light is emitted in a direction vertical to a light emitting surface of the surface emission device. In other words, it is not a fundamental solution to devise the shape of the concave portions to reduce the light emitted toward directly above the light source, because the light is emitted in a direction vertical to the light emitting surface. As such, the brightness is still higher in a region directly above the light source than in the other regions. This causes brightness uniformity not to be realized.

The present invention is made in view of the problems. An object of the present invention is to provide an illumination device and a light emitting element, both of which have sufficient brightness and are superior in brightness uniformity even when a light emitting area becomes larger, and to realize a large and thin display.

In order to attain the object, a light emitting element of the present invention including: a plurality of light sources; and a light guiding body for causing light emitted from the plurality of light sources to be surface-emitted, wherein: concave portions, in which the plurality of light sources are provided, are provided on a bottom surface inside the light guiding body, the plurality of light sources emit light from their side surfaces which face side surfaces of the concave portions, respectively, and at least two of the plurality of light sources emit light in directions which are different from each other.

Conventionally, light sources have been provided to be in contact with edge surfaces of the light guiding body. According to the arrangement above, however, the light sources are provided in the concave portions provided inside the light guiding body. This allows the light sources to be provided even in a center region of the light emitting surface. Therefore, it is possible to enhance brightness of a whole light emitting surface even in a case where a large illumination device is realized by combining a plurality of light emitting elements. Further, by providing the light sources inside the light guiding body, it is possible to realize a light emitting element which is thinner than a light emitting element in which the light sources are provided behind the light guiding body.

Furthermore, the light source emits light from the surface facing the side surface of the concave portion provided on the bottom surface of the light guiding body. Thereby, it is possible to reduce an amount of light that is directly emitted from the light emitting surface. This can prevent regions where the light sources are provided from becoming brighter than the other regions. In addition to this, light can reach every corner of the light guiding body, since the light sources emit the light in directions which are different from each other. Accordingly, by use of the light emitting element of the present invention, it becomes possible to realize an illumination device which is superior in brightness uniformity even when a light emitting area becomes larger.

In the light emitting element of the present invention, the light sources preferably emit the light in directions along a light emitting surface of the light guiding body, from which light emitting surface light is emitted toward a light emitting target.

Here, the light sources emit light in the direction along the light emitting surface of the light guiding body. More specifically, each of the light sources provided inside the light guiding body emit light not in a normal direction of the light emitting surface but in a direction along a shape of the light emitting surface. In other words, light is emitted from the light sources mainly in a direction substantially parallel to the light emitting surface of the light guiding body. Light is usually emitted not in a single direction but in various directions with certain radiation characteristics. In the present specification, "light emitting direction" is a direction in which major components of the light are emitted. That is, "light emitting direction" is a direction of major components of the light emitted from the light source. Additionally, in a case where the light emitting element of the present invention is used as a backlight of the liquid crystal display device, for example, the light emitting target is a liquid crystal display panel.

With the arrangement described above, the directions, in which the light is emitted from the light sources, are along the light emitting surface, so that light directly emitted from the light emitting surface can be further reduced in amount. Thereby, it becomes possible to prevent the regions where the light sources are provided from becoming brighter than the other regions. It is preferable to arrange the directions, in which the light is emitted from the light sources, to be parallel to the light emitting surface in order to further reduce the amount of the light directly emitted from the light emitting surface.

In the light emitting element of the present invention, said at least two of the plurality of light sources (i) are preferably provided so as to face each other, and (ii) preferably emit the light so that one of the plurality of light sources emits light toward the other one of the plurality of light sources.

According to the arrangement, the light sources are provided so that the light emitted from one of them reach a region (dead area) where the light emitted from the other one of them cannot reach, and vice versa. This makes it possible to obtain a light emitting element having no dark regions, because the light emitted from each light source is emitted from a whole light emitting surface so that the light sources irradiates their dead areas with each other.

In the light emitting element of the present invention, concavity and convexity are preferably provided on the side surfaces of the concave portions, which side surfaces face light emitting surfaces of the plurality of light sources, respectively.

According to the arrangement, the concavity and convexity are provided on the side surfaces of the concave portions, which side surfaces face light emitting surfaces of the plurality of light sources, so that the light emitted from the light sources is scattered. This can prevent the light from being reflected from the side surfaces of the light guiding body. As such, it is possible to use the light emitted from the light sources efficiently. The concavity and convexity provided on the side surfaces of the light guiding body are fine ones formed by a general processing treatment for preventing light reflection.

In the light emitting element of the present invention, a light diffusing member for directing light to a light emitting surface of the light guiding body is preferably provided on at least one of the light emitting surface of the light guiding body and an opposite surface of the light emitting surface.

With the arrangement, it is possible to improve use efficiency of the light, because a total reflection condition of the light emitted from the light sources is not fulfilled, and the light is directed to the light emitting surface of the light guiding body efficiently. This causes the light emitted from the light sources to be emitted from a whole surface of the light guiding body. Thus, the dead areas are eliminated, and the brightness uniformity can be further improved.

In the light emitting element of the present invention, the light diffusing member is preferably concavity and convexity provided on the light emitting surface or the opposite surface, and density of the concavity and convexity in a region toward which light is emitted from a light source is preferably different from the density in the other region.

According to the arrangement, the density of the concavity and convexity in the region toward which light is emitted from a light source is different from the density in the other region, so that it is possible to control how highly the light is scattered for each of the regions described above. For example, it is possible to have higher density of the concavity and convexity in a region behind the light emitting surface of the light source than in the other regions. Next to each of the light sources, there are two regions where the light hardly reaches. However, this arrangement can enhance the intensity of the light in the regions, and allow the light to be directed to the light emitting surface. Thereby, it becomes possible to emit the light emitted from the light sources, from the whole light emitting surface uniformly.

In the light emitting element of the present invention, the light guiding body becomes preferably less in thickness as it is farther away from the light sources.

According to the arrangement, a total reflection condition, which is based on the Snell's law, is not to be fulfilled while the light emitted from the light sources travels in the light guiding body. Compared with an arrangement in which the light guiding body has a constant thickness, light exiting from edge surfaces of the light guiding body is reduced in amount, so as to improve light emitting efficiency. Further, even in a region where (i) the light emitting surface is far away from the light sources and (ii) the light amount from the light sources becomes less, it is possible for the light emitting surface to emit light having intensity substantially equal to light in a region close to the light sources. Therefore, it is possible to further uniform brightness. Note that the thickness of the light guiding body means a width of the light guiding body in a direction vertical to the light emitting surface of the light guiding body.

In the light emitting element of the present invention, light shielding means for shielding light is preferably provided in a region of a light emitting surface where the light emitting surface and respective of the plurality of light sources overlap each other.

With the arrangement, it is possible to successfully prevent the light emitted from the light sources from directly entering the light emitting surface. This makes it possible to obtain a light emitting element that is further advantageous in brightness uniformity.

Here, the light shielding means may be any means for shielding or totally reflecting the light in order to prevent the light from directly exiting through the light emitting surface. The shielding means may be a shielding member which is generally used in order to shield light. Alternatively, the light shielding means can be realized by changing a shape of the light emitting surface of the light guiding body, for example, by inclining the light emitting surface in the regions where the light emitting surface and the light sources overlap each other. Note that the regions are regions where the light emitting surface and the light regions where the light sources are provided inside the light guiding body overlap each other in the light emitting surface when viewed from directly above. In the present specification, the overlapped region is also referred to as a light source providing region.

The light shielding means is preferably provided not only in the light source providing regions where the light emitted from the light source directly enters the light emitting surface, but also in regions in the vicinity of the light source providing regions, in the light emitting surface. That is, the light shielding means is preferably provided not only in the regions directly above the light sources, but also in other regions obliquely above the light sources in the light emitting surface. This successfully prevents the light emitted from the light sources from directly entering the light emitting surface.

In the light emitting element of the present invention, the plurality of light sources are preferably light emitting diodes.

With the arrangement, it is possible to realize a smaller and thinner light emitting element. Therefore, it becomes possible to realize a thinner liquid crystal display device by using the light emitting element of the present invention as a backlight of the liquid crystal display device.

An illumination device of the present invention includes any one of the light emitting elements described above, wherein: the light emitting surface irradiating a light emitting target with light.

Conventionally, the light sources have been provided so as to be in contact with edge surfaces of the light guiding body. With the arrangement described above, however, the light sources are provided inside the light guiding body, so that it becomes possible to provide the light sources even in the center of the light emitting surface. Thereby, it is possible to enhance brightness of the whole light emitting surface, even when the illumination device becomes larger. Further, by providing the light sources inside the light guiding body, it is possible to realize an illumination device which is thinner than an illumination device in which light sources are provided behind the light guiding body.

Furthermore, the light sources emit light from their side surfaces which face the side surfaces of the concave portions provided on the bottom surface of the light guiding body. This can reduce the amount of light directly emitted from the light emitting surface, so as to prevent the light source providing regions from becoming brighter than the other regions. In addition to this, the light sources emit light in directions which are different from each other, so that the light can reach every corner of the light guiding body. Accordingly, it is possible to realize an illumination device that is advantageous in brightness uniformity even when the light emitting area becomes larger.

Moreover, unlike a conventional side light illumination device in which the light sources gather in the edge surfaces of the light guiding body, the light sources can be provided so as to be dispersed (provided far away from each other) inside the light guiding body. This can prevent heat created by the light sources from concentrating in a region. Therefore, by making a discharge mechanism more simple, it becomes possible to suppress an increase in cost. Further, it is possible to raise discharge performance of the light sources by using light emitting diodes (LED) as the light sources. This improves light emitting efficiency.

In the illumination device of the present invention, the light emitting element is preferably plurally prepared and combined.

With the arrangement, it is possible to realize an illumination device which has sufficient brightness and is superior in brightness uniformity even when an illumination device becomes larger. Furthermore, it is possible to realize an illumination device by aligning, in a regular pattern, the light emitting elements, each of which have the same arrangement. Therefore, each of the light sources can be mounted easily and accurately. Thus, productivity of the illumination device can be improved.

The illumination device of the present invention preferably includes a drive section for driving the light emitting elements independently.

With the arrangement, it is possible to control light intensity for each light emitting target region. Therefore, it is possible to control the light intensity of the backlight for each display region by using the illumination device of the present invention as a backlight of a liquid crystal display device. For example, it is possible to carry out image display with higher contrast, when the drive section adjusts the light intensity of each of the light emitting elements such that the illumination intensity is low in a region where a blackish image is displayed, whereas is high in a region where a whitish image is displayed, for example.

In the illumination device of the present invention, the plurality of the light sources preferably including: a first light source group including a plurality of light sources which emit light in a first direction, and are provided in a line; and a second light source group including a plurality of light sources which emit light in a second direction that is different from the first direction, and are provided so as to face the plurality of light sources of the first light source group, respectively.

According to the arrangement, the plurality of light sources constituting the first light source group is provided and mounted on a single substrate, and a plurality of the light sources constituting the second light source group is also provided and mounted on another single substrate. The substrates are arranged such that the light sources of the first light source group face the light sources of the second light source group respectively. Thus, the plurality of light sources constituting the illumination device can be mounted easily and accurately. As such, it is possible to improve productivity of an illumination device.

Further, the illumination device of the present invention can have a plurality of combinations of the first light source group and the second light source group.

Furthermore, according to the illumination device of the present invention, sensors are preferably provided inside the light guiding body.

According to the arrangement, measured results found by the sensors are fed back to a drive circuit of the illumination device, and the drive circuit adjusts an amount of the light based on the results. This makes it possible to equalize the light amount of each of the light sources. This makes it possible to further uniform brightness of the whole light emitting surface of the illumination device.

A liquid crystal display device of the present invention includes any one of the light emitting element described above, as a backlight. Further, a liquid crystal display device of the present invention includes an illumination device of the present invention, as a backlight.

According to the arrangement, the liquid crystal display device includes the illumination device or light emitting element of the present invention, so that it is possible to realize a liquid crystal display device that has sufficient brightness and is superior in brightness uniformity even when a liquid crystal display device becomes larger.

Additional objects, features, and strengths of the present invention will be made clear by the description below. Further, the advantages of the present invention will be evident from the following explanation in reference to the drawings.

EXPLANATION OF LETTERS AND NUMERALS

1. LIQUID CRYSTAL DISPLAY DEVICE
2. BACKLIGHT (ILLUMINATION DEVICE)
3. LIQUID CRYSTAL DISPLAY PANEL
4. SUBSTRATE
5. LIGHT SOURCE
5a and 5a'. LIGHT SOURCES
5b and 5b'. LIGHT SOURCES
5c and 5c'. LIGHT SOURCES
5s. LIGHT EMITTING SURFACE (OF LIGHT SOURCE)
7. LIGHT GUIDING BODY
7a. LIGHT EMITTING SURFACE (OF LIGHT GUIDING BODY)
7b. BACK SURFACE (OPPOSITE SURFACE) (OF LIGHT GUIDING BODY)
9. CONCAVE PORTION
11. LIGHT EMITTING ELEMENT
21. LIGHT EMITTING ELEMENT
31. PHOTO DIODE (SENSOR)
32. BACKLIGHT (ILLUMINATION DEVICE)

BEST MODE FOR CARRYING OUT THE INVENTION

One embodiment of the present invention is described in detail below with use of examples, and with reference to the attached drawings. Note that sizes, materials, shapes, relative locations, and the like, of constituents described in the embodiment are merely examples for explanations, and therefore do not limit the scope of the present invention, as long as they are not particularly specified.

In the present embodiment, an illumination device used as a backlight of a liquid crystal display device is explained with reference to FIGS. 1 through 11.

Figure 1:
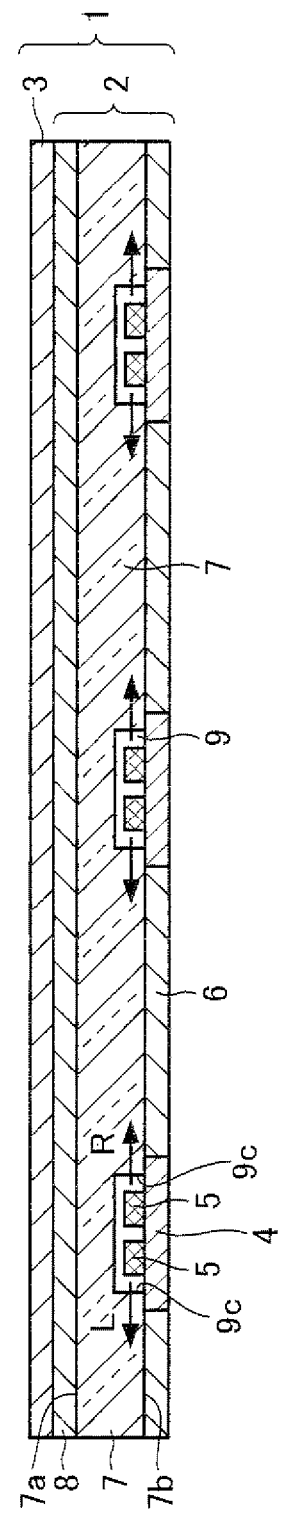
FIG. 1 is a cross-sectional view illustrating an arrangement of a liquid crystal display device in accordance with an embodiment of the present invention.

FIG. 1 illustrates a liquid crystal display device 1 in accordance with the present embodiment. The liquid crystal display device 1 includes a backlight 2 (illumination device) and a liquid crystal display panel 3. A description regarding an arrangement of the liquid crystal display panel 3 is omitted because it has the same arrangement as a general liquid crystal display panel used in a conventional liquid crystal display device. The following description deals with, in detail, an arrangement of the backlight 2 included in the liquid crystal display device 1.

The backlight 2 is provided behind (on an opposite side of a display surface) the liquid crystal display panel 3. The backlight 2 includes substrates 4, light sources 5, light reflecting sheets 6, a light guiding body 7, and an optical sheet 8, as illustrated in FIG. 1.

The light sources 5, provided on the substrates 4, are, for example, point light sources such as side light emitting-type LEDs. The light sources 5 can be side light-type LEDs each of which includes R, G, and B chips molded in a single package. In this case, it is possible to realize an illumination device having a wide color reproduction range. A reflecting sheet 6 is provided between adjacent two of the substrates 4. It is preferable to use white substrates as the substrates 4, respectively, in order to enhance brightness. The light guiding body 7 is provided so as to cover the respective light sources 5.

The light guiding body 7 causes light, which has been emitted from the light sources 5, to be surface-emitted from a light emitting surface 7a. The light emitting surface 7a is a surface for irradiating a light emitting target (i.e. the liquid crystal display panel 3) with the light. The light guiding body 7 can be made of a transparent resin such as an acrylic resin, a COP (cyclo olefin polymer: ZEONOR (a trade name), for example), a COC (cyclo olefin copolymer), or a polycarbonate. The material is, however, not limited to these. Alternatively, the light guiding body 7 can be made of a material generally used as a light guiding body. Hollow concave portions 9 are provided on a bottom surface (corresponding to a surface inside a back surface 7b) inside the light guiding body 7 such that the light sources 5 are provided in the concave portions 9. This causes a light source 5 to be in respective one of the concave portions inside the light guiding body 7. The light guiding body 7 is molded by a molding method such as injection molding, or by cutting.

A reflecting sheet 6 is provided, between adjacent two of the substrates 4, so as to be in contact with the back surface 7b (the surface facing the light emitting surface) of the light guiding body. The light reflecting sheets 6 reflect light so as to cause the light emitting surface 7a to emit a great deal of light.

With the arrangement, light emitted from the point light sources 5 travels in the light guiding body 7, while scattered and reflected, is then outgoes from the light emitting surface 7a, and then reaches the liquid crystal display panel 3, via the optical sheet 8. Note that the optical sheet 8 can be, but not limited to, a diffusing plate, a diffusing sheet, a prism sheet, a polarized light reflecting sheet, or the like.

According to the backlight 2 of the present embodiment, the light sources 5 are provided inside the light guiding body 7, unlike a conventional side light type in which the light sources are provided on an edge surface of the light guiding body. This eliminates necessity of having a frame region where the light sources are provided, so that a frame region of the device can be narrower. Further, it is possible to realize a thinner backlight because the light sources of the present embodiment are not provided behind the light guiding body, unlike a conventional direct backlight.

FIG. 1 also illustrates the directions, indicated by the arrows, in which the light is emitted from each of the light sources 5 in the backlight 2. Each of the light sources 5 emits the light along the light emitting surface 7a of the light guiding body 7 (see the arrows in FIG. 1). That is, the light sources 5 on the substrates 4 emit the light from their side surfaces, and the directions in which the light sources 5 emit the light are parallel to the light emitting surface 7a. Namely, the light sources 5 emit the respective light in a direction along the light emitting surface 7a. Further, the light emitting directions of adjacent two of the light sources 5 are different from each other. Arrows L and R show the light emitting directions of the adjacent two of the light sources 5 respectively. As such, according to the backlight 2 of the present embodiment, there are at least two directions in which the respective light are emitted from the light sources 5.

Since the light sources 5 thus emit the light in the directions parallel to the light emitting surface 7a, it is possible to reduce the amount of light directly emitted from the light emitting surface 7a. Therefore, it is possible to prevent regions where the light sources are provided from becoming brighter than the other regions. In addition to this, since the adjacent two of the light sources 5 emit the light in different directions, the light can reach every corner of the light guiding body. Therefore, it is possible to further improve brightness uniformity, as compared with a conventional backlight.

Note that the present invention is not limited to a case where the major components of the directions in which the light sources 5 emit the light are exactly parallel to the light emitting surface 7a. That is, the present invention includes a case where the major components of the directions in which the light sources 5 emit the light are substantially parallel to the light emitting surface 7a, provided that the light sources 5 emit the light from surfaces facing side surfaces 9c of concave portions 9, which are provided on the bottom surface of the light guiding body 7.

Further, fine concavity and convexity (light diffusing member), not illustrated in FIG. 1, can be provided on at least one of the light emitting surface 7a of the light guiding body and the back surface 7b (an opposite surface (a bottom surface) of the light guiding body 7 which opposite surface faces the light emitting surface 7a). The fine concavity and convexity are formed by texturing in order to direct the light emitted from the light sources 5 toward the light emitting surface 7a, and cause the light to be emitted from the light emitting surface 7a. With the arrangement, the light emitted from the light sources can be efficiently led to the light emitting surface of the light guiding body. This can improve use efficiency of the light.

The light diffusing member of the present invention can be, but not limited to, the fine concavity and convexity (textured shapes, for example) described above, a printed dot pattern (a dot pattern made by white printing, for example), a prism, or the like. A conventional light diffusing member of an illumination device can be used as the light diffusing member.

Figure 2:
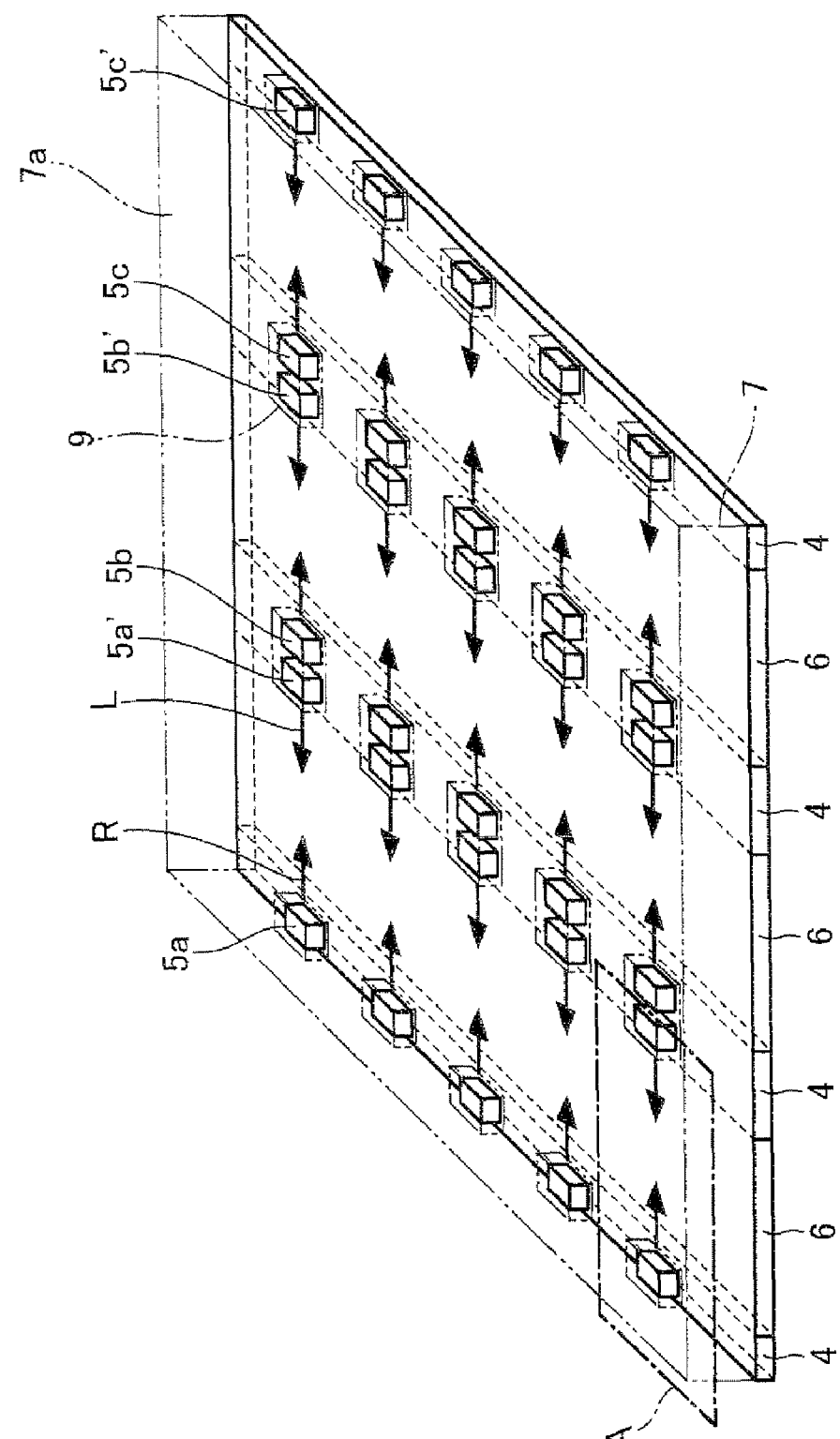
FIG. 2 is a perspective view obtained in a case where a backlight included in the liquid crystal display device illustrated in FIG. 1 is viewed from a light emitting surface side.

FIG. 2 is a perspective view obtained in a case where the light guiding body 7 is viewed from a light emitting surface 7a side in the backlight 2. Arrows R and L show the directions in which each of the light sources 5 emits the light (the directions in which the light exits). In the backlight 2 of the present embodiment, the two adjacent light sources, for example, 5a and 5a', 5b and 5b', and 5c and 5c', are provided so as to face each other. The directions in which the light sources emit the light are set so that the light sources 5a, 5b, and 5c emit light toward their adjacent light sources 5a', 5b', and 5c', respectively, while the light sources 5a', 5b' and 5c' emit light toward their adjacent light sources 5a, 5b, and 5c, respectively.

According to the backlight 2, each of the adjacent two light sources is provided so that the light emitted from one of them reach a region (dead area) where the light emitted from the other one of them cannot reach, and vice versa. With the arrangement, one of the adjacent two light sources covers the dead area (a region where the one light source cannot emit light) of the other one of the adjacent two light sources. This allows the light to be emitted from the entire surface of the light emitting surface 7a. As such, it becomes possible to obtain a backlight having no dark region. Note that adjacent two light sources 5 do not have to be provided to face each other, provided that the light sources 5 are provided so that the light emitted from each of the light sources 5 can cover the dead area of the other one of the light sources.

Further, according to the present embodiment, a plurality of light sources 5a (first light source group), each of which emits light in a direction indicated by the arrow R (first direction), are mounted in a line on a single substrate 4. Meanwhile, a plurality of the light sources 5a' (second light source group), each of which emits light in a direction indicated by the arrow L (second direction), are mounted in a line on another single substrate 4. The substrate 4 on which the plurality of light sources 5a are mounted, and the substrate 4 on which the plurality of light sources 5a' are mounted, are provided such that the light sources 5a and 5a' face each other, respectively.

The light sources 5b and 5b', and 5c and 5c' are arranged in the same manner. A plurality of the light sources 5b (the first light source group) and a plurality of the light sources 5c (the first light source group) emit light in the direction indicated by the arrow R. Each of the first light source groups is mounted in a line on a single substrate 4. Meanwhile, a plurality of the light sources 5b' (the second light source group) and a plurality of the light sources 5c' (the second light source group) emit light in the direction indicated by the arrow L. Each of the second light source groups is also mounted in a line on a single substrate 4.

Therefore, it is possible to provide a plurality of light sources constituting the backlight 2 easily and accurately, by providing light source groups, each in a line, on a single substrate as described above. This improves productivity of the backlight 2.

Figure 3:
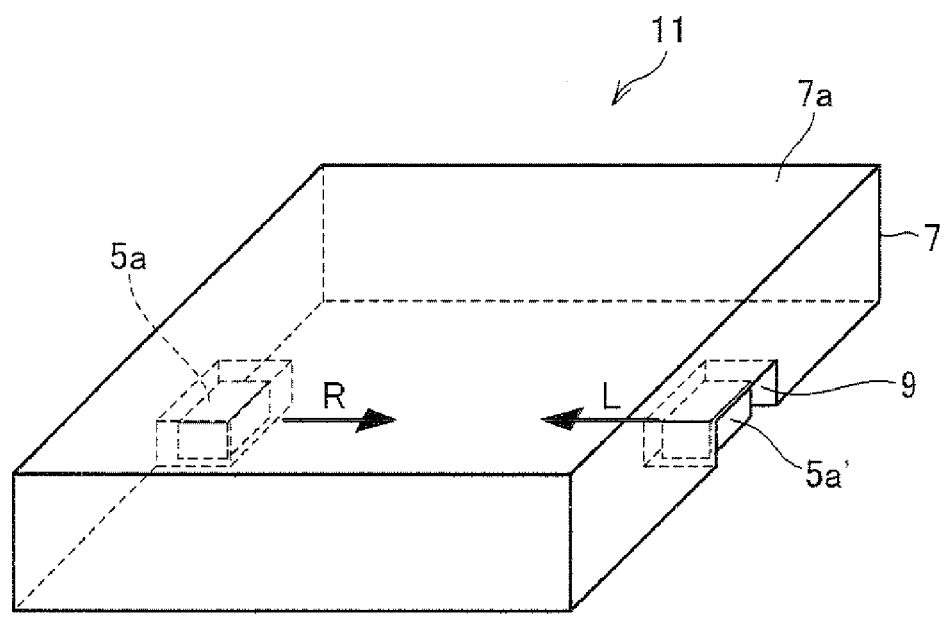
FIG. 3 is a perspective view illustrating a light emitting element in accordance with the embodiment of the present invention.
Figure 4:
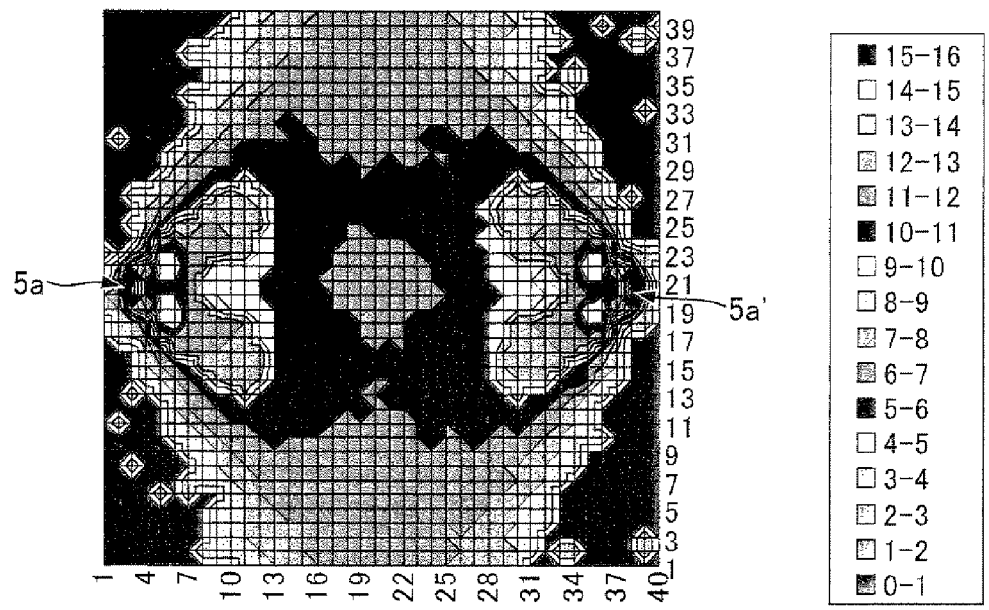
FIG. 4(a) is a graph showing an example of a density distribution of concavity and convexity provided on a surface (light emitting surface) of the light emitting element illustrated in FIG. 3, more specifically, showing the density in terms of depths of color.
FIG. 4(b) is a graph showing an example of a density distribution of concavity and convexity provided on a surface (light emitting surface) of the light emitting element illustrated in FIG. 3, more specifically showing the density in terms of height.
Figure 4:
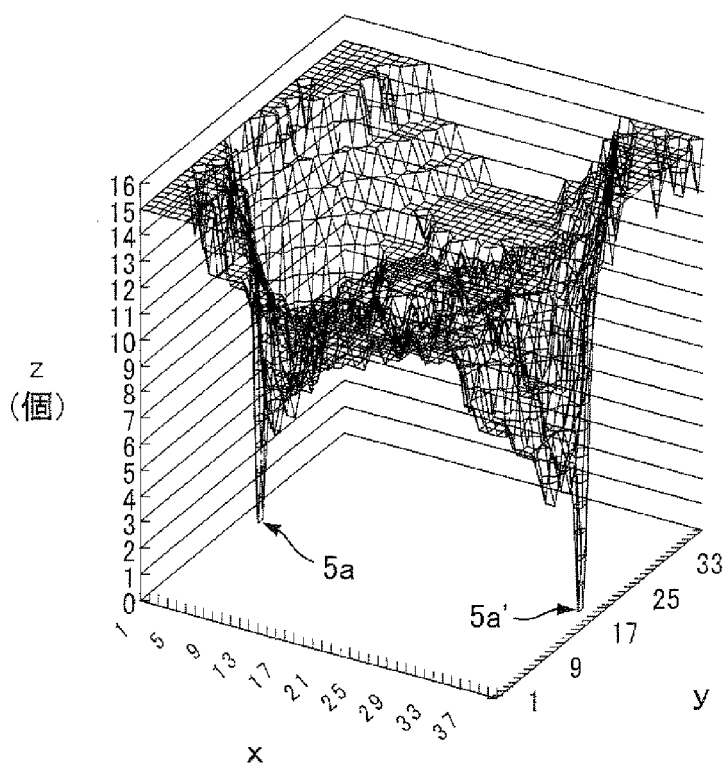

FIG. 3 is an enlarged view of a part A, indicated by a dashed-dotted line in FIG. 2, in the backlight 2. The arrangement, in which two light sources are provided so as to face each other (see FIG. 3), corresponds to a light emitting element of the present invention. A light emitting element 11, illustrated in FIG. 3, includes two light sources 5a and 5a', and a light guiding body 7, which causes light emitted from the light sources to be surface-emitted. The light sources 5a and 5a', provided in hollow concave portions 9 inside the light guiding body 7, respectively, face each other. Note that the light sources 5a and 5a' are provided on substrates (not illustrated), respectively. The directions (indicated by the arrows R and L), in which the light sources 5a and 5a' emit light, are parallel to the light emitting surface 7a of the light guiding body 7, respectively, and are set so that one of the light sources 5a and 5a' emits light toward the other one of the light sources 5a and 5a', and vice versa.

Thus, according to the light emitting element 11, two point light sources which face each other are provided so that the light emitted from one of the two point light source reaches a region where the light emitted from the other one of the point light sources cannot reach, and vice versa. By providing a plurality of such light emitting elements, it becomes possible to realize a large backlight having no dark region.

The light emitting element of the present embodiment includes two light sources, but the present invention is not limited to this. The light emitting element of the present embodiment can include three or more light sources.

The following description deals with in detail how the light emitting element 11 is arranged.

Like the backlight 2 described above, fine concavity and convexity (light diffusing member) can be formed on at least one of the light emitting surface 7a of the light guiding body and the back surface 7b (an opposite surface of the light guiding body 7 which opposite surface faces the light emitting surface 7a), in the light emitting element 11. The fine concavity and convexity are formed by texturing, for example, in order to direct the light emitted from the light sources 5 and 5a toward the light emitting surface 7a, and cause the light to be emitted from the light emitting surface 7a. Density of the concavity and convexity (i.e. the number of concavity or convexity per unit area) preferably differs depending on the positions of the concavity and convexity with respect to the light sources 5a and 5a'. Specifically, it is preferable that the density in a region toward which light is emitted from a light source is different from the density in the other region.

Figure 5:
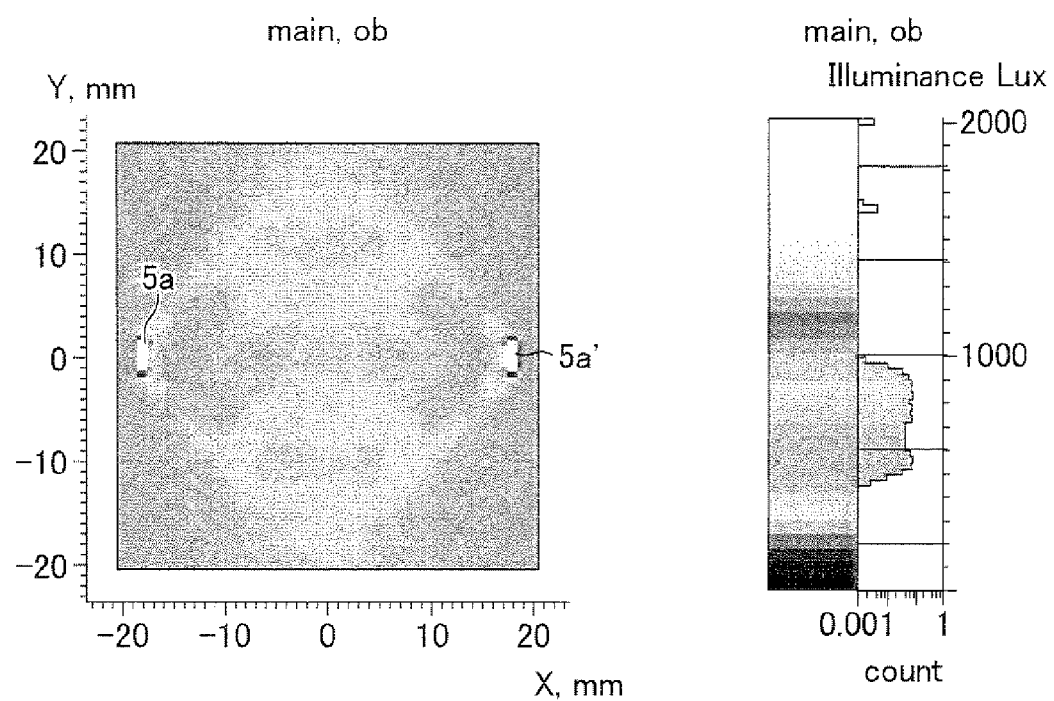
FIG. 5 shows an illumination distribution of the light emitting element having the density of the concavity and convexity shown in FIGS. 4(a) and 4(b).
Figure 6:
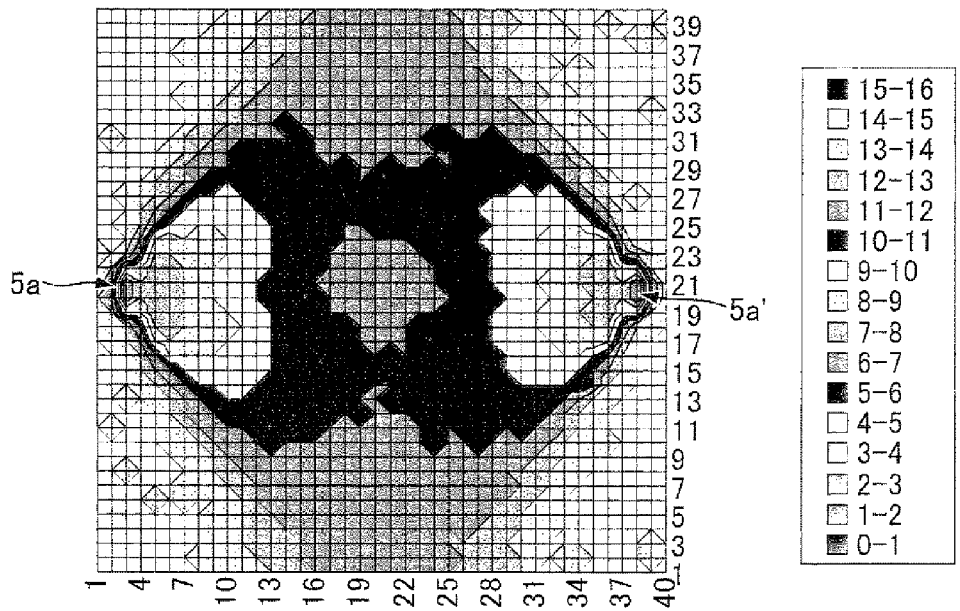
FIG. 6(a) is a graph showing another example of a density distribution of concavity and convexity provided on a surface (light emitting surface) of the light emitting element illustrated in FIG. 3, more specifically, showing the density in terms of depths of color.
FIG. 6(b) is a graph showing another example of a density distribution of concavity and convexity provided on a surface (light emitting surface) of the light emitting element illustrated in FIG. 3, more specifically showing the density in terms of height.
Figure 6:
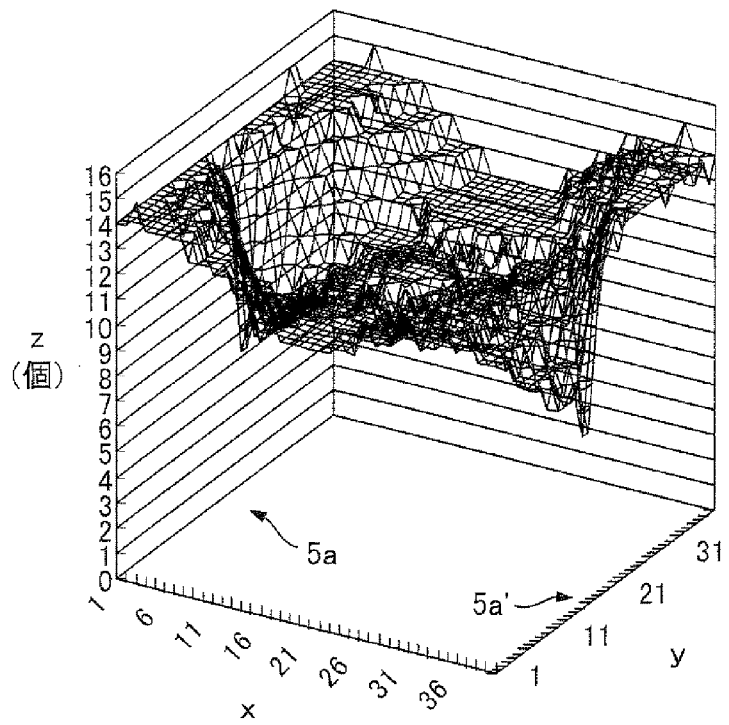

FIGS. 4(a) and 4(b) show a density distribution of the concavity and convexity (the number of convex sections per unit area (1 mm×1 mm), referred to as texture density), which are obtained by texturing the light emitting surface 7a of the light emitting element 11. FIG. 4(a) shows each of the texture density, which is shown in terms of depths of color for respective positions with respect to the light sources 5a and 5a' in the light emitting element 11. FIG. 4(b) is a graph in which each position in the light emitting element 11 is shown by use of an x-y plane and the texture density at each of position is indicated by z-axis. FIG. 5 shows a measured result of an illumination distribution of the light emitting element 11 which has the texture density shown in FIGS. 4(a) and 4(b).

Figure 7:
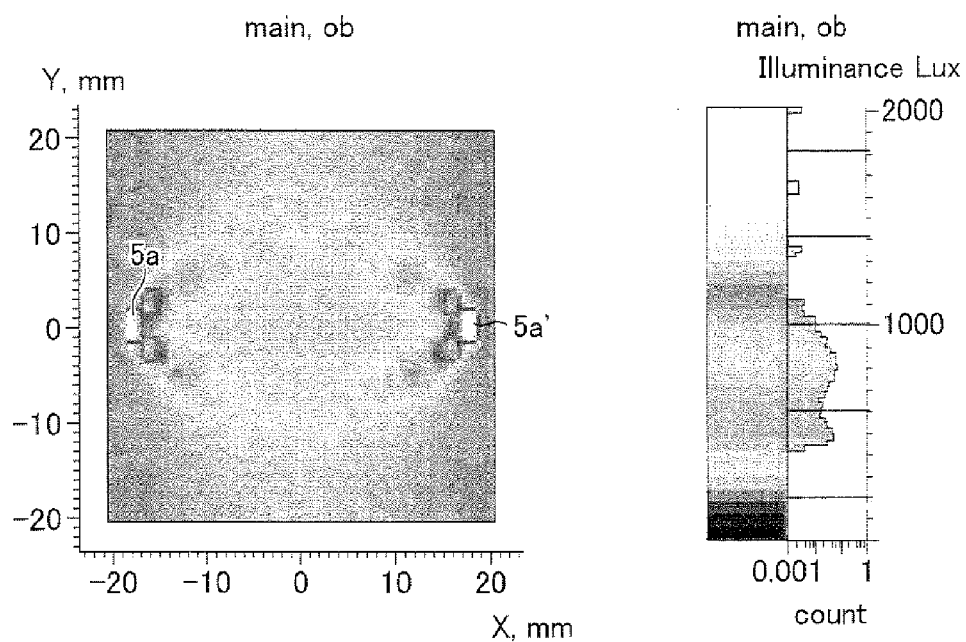
FIG. 7 shows an illumination distribution of the light emitting element having the density of the concavity and convexity shown in FIGS. 6(a) and 6(b).

Further, FIGS. 6(a) and 6(b) show another example of a density distribution of the concavity and convexity which are obtained by texturing the light emitting surface 7a of the light emitting element 11. FIG. 7 shows a measured result of an illumination distribution of the light emitting element 11 which has the texture density shown in FIGS. 6(a) and 6(b).

Figure 8:
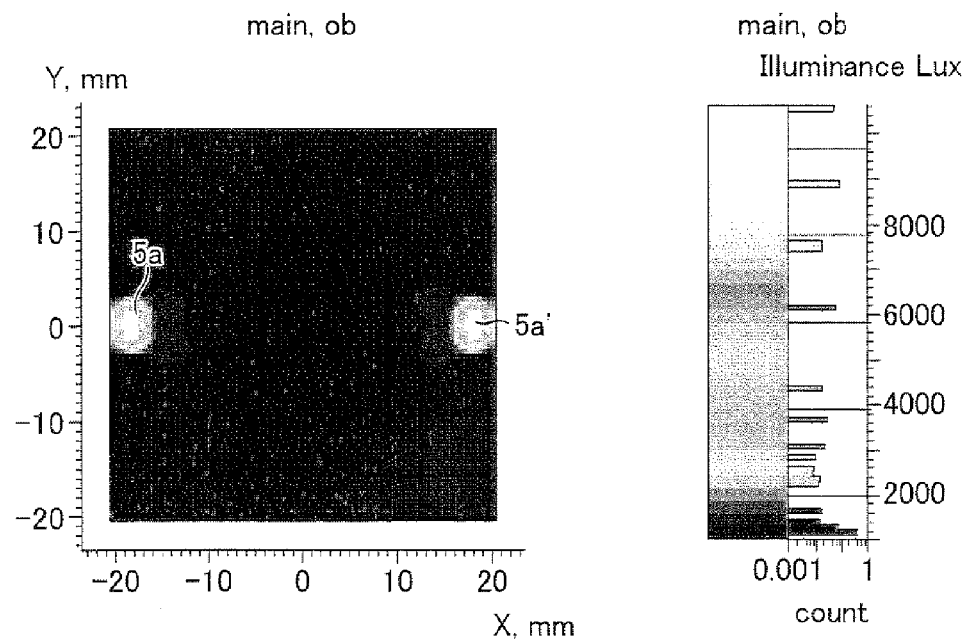
FIG. 8 shows an illumination distribution of a light emitting element which has constant density of concavity and convexity.

Furthermore, for comparison, FIG. 8 shows an illumination distribution obtained in a case where the concavity and convexity are distributed equally (constant density) on the light emitting surface 7a. As shown in FIG. 8 (drawing on the right side, especially), when the texture density on the light emitting surface 7a is constant, unevenness of illumination occurs in the surface due to a light distribution property of LEDs which are used as the light sources.

Figure 9:
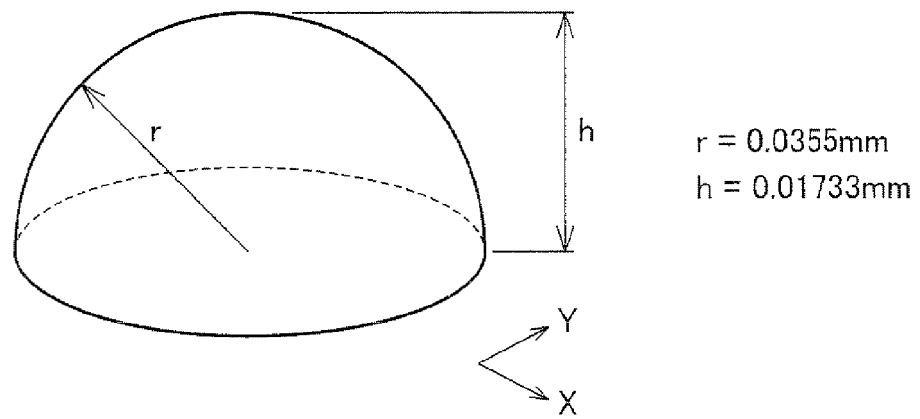
FIG. 9 illustrates an example of a convex shape formed on a light emitting surface.

On the other hand, when the texture density is changed depending on the positions with respect to the light sources as illustrated in FIGS. 4(a), 4(b), 6(a), and 6(b), all positions are irradiated with light almost uniformly (each position has brightness within a specific range) except regions directly above the LEDs (the source providing region), as illustrated in FIGS. 5 and 7. Note that FIG. 9 illustrates a substantially hemisphere shape as an example of the convexity formed on the light emitting surface 7a. The shape and size of the convexity shown in FIG. 9 are merely examples.

Thus, with the arrangement in which the density of the concavity and convexity, which are formed on at least one of the light emitting surface 7a and back surface 7b of the light guiding body 7, is changed depending on the positions of the concavity and convexity with respect to the light sources, it becomes possible to realize a light emitting element which has a uniform brightness property. Note that the density distributions of the concavity and convexity, shown in FIGS. 4(a), 4(b), 6(a), and 6(b), are merely examples. The present embodiment is not limited to these.

Figure 10:
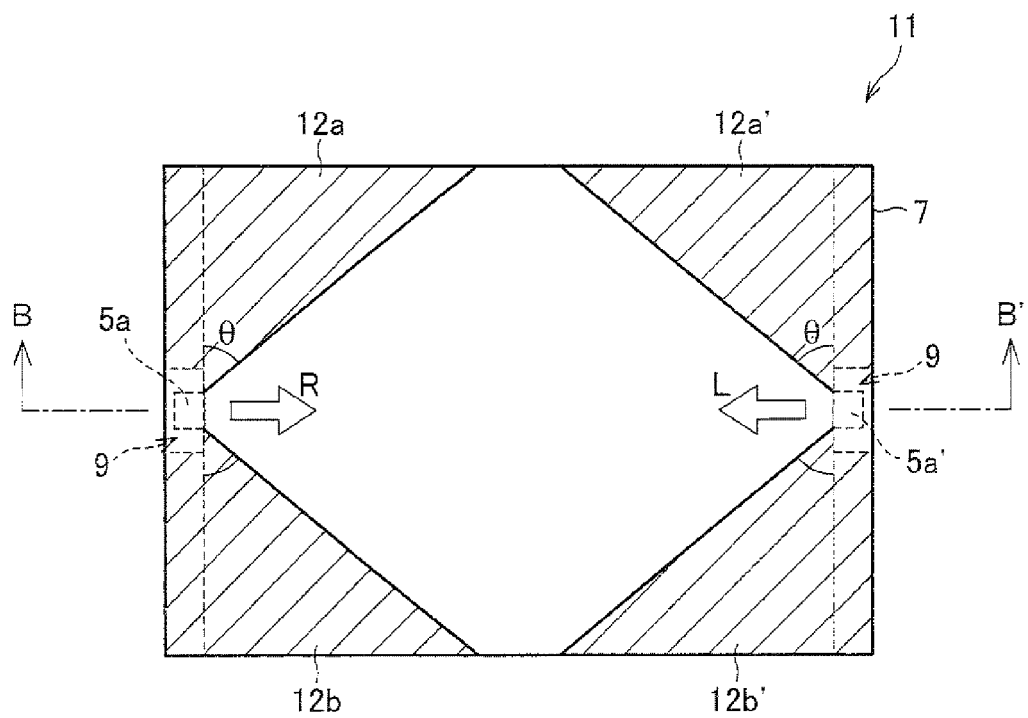
FIG. 10 is a plan view schematically illustrating a region to which light sources emit light.

FIG. 10 schematically illustrates an irradiation region of the light sources 5a and 5a' provided in the light emitting element 11. The directions in which the two light sources 5a and 5a', facing each other, emit light are the directions indicated by the arrows R and L, as illustrated in FIG. 10, As such, the light emitted from one of the light sources 5a and 5a' can reach a region where the light emitted from the other one of the light sources 5a and 5a' cannot reach.

However, even with such an arrangement, there is still a region where the light intensity is lower than the other regions. Specifically, the light source can irradiate, with sufficient light intensity, a region where the angle from the surface of the light source from which the light is emitted is approximately 30° C. or more. However, the light intensity becomes lower in regions where the angle θ is less than approximately 30° C. and in a region behind the surface of the light source from which the light is emitted (these regions having less light intensity are marked with slash lines, and referred to as corner regions 12a, 12b, 12a', and 12b', in FIG. 10) than in the other regions.

Therefore, it is preferable for the corner regions 12a, 12b, 12a', and 12b' for the diffusing use to have higher density of the concavity and convexity which are formed on either the light emitting surface 7a or the back surface 7b of the light guiding body 7. Here, the corner regions (12a, 12b) and (12a' and 12b') are on the opposite side of the light emitting side of the light sources 5a and 5a', respectively.

Figure 11:
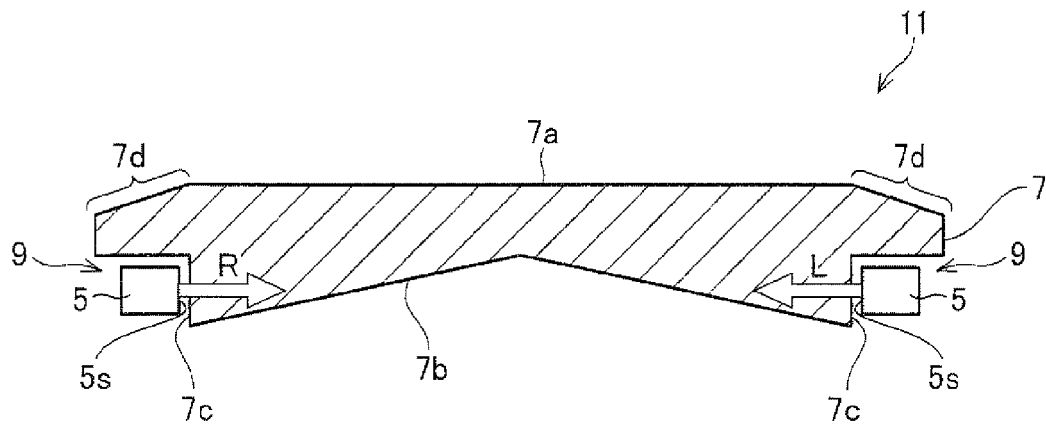
FIG. 11 is a cross-sectional view of the light emitting element illustrated in FIG. 10, taken along the line B-B'.

FIG. 11 is a cross-sectional view illustrating the light emitting element 11, taken along the line B-B' in FIG. 10. According to the light emitting element 11, the concave portions 9 are thus formed in the light guiding body 7, and the light sources 5, such as the LEDs, are provided in the concave portions 9 (see FIG. 11). By arranging a plurality of such light emitting elements 11, it is possible to obtain a backlight in which the entire light emitting surface 7a emits light uniformly. It is possible to arrange the backlight 2 which has an arrangement constituted by the light sources 5a, 5a', 5b, 5b', 5c, and 5c' (see FIG. 2) such that the light emitting elements 11 are provided in a grid pattern. Such an arrangement makes it possible to use the whole surface of the light emitting element as a light emitting surface by eliminating unused periphery portions. Further, it becomes possible to provide each of the light emitting elements 11 with high accuracy.

In the light emitting element 11, each of the surfaces 7c (corresponding to one side surface 9c constituting the concave portion 9) of the light guiding body 7 faces the light emitting surface 5s (one side surface of, for example, a rectangular solid light source) of the light source 5 (see FIG. 11). Each of the surfaces 7c preferably has concavity and convexity for scattering light. With such an arrangement in which the concavity and convexity are formed on each of the surfaces 7c of the light guiding body 7, the light emitted from the light sources 5 is scattered by the surfaces 7c, so as to prevent the light from being reflected from the surfaces 7c. Therefore, it becomes possible to efficiently use the light emitted from the light sources 5. The concavity and convexity provided on the surfaces 7c are fine ones formed by general processing treatment (especially, concave-convex processing treatment carried out in the manufacture of an illumination device employing conventional side light LED light sources) for preventing light reflection. The widths of the concavity and convexity are preferably about dozens of microns.

Further, the light guiding body 7 preferably becomes less in thickness (width of the light guiding body 7 in a direction vertical to the light emitting surface 7a) as it is farther away from the light sources 5. The fact that light guiding body 7 becomes less in thickness as it is farther away from the light sources 5 means that the back surface 7b of the light guiding body 7 is not flat but taper-shaped, i.e., the light guiding body 7 becomes less in thickness as it is farther away from the light sources 5 (see FIG. 11, for example). In a case where the back surface 7b of the light guiding body 7 has such a taper shape, the thickness of the light guiding body is, for example, approximately 1 mm to 2 mm in the thickest portion, and 0.6 mm to 1.2 mm in the thinnest portion. Note that the shape of the back surface 7b is not limited to the taper shape in the present invention.

Such an arrangement causes a total reflection condition, which is based on the Snell's law, not to be fulfilled while the light emitted from the light sources travels in the light guiding body. This allows a further improvement in light emitting efficiency, as compared with an arrangement in which a flat back surface is used. Further, even in a region where (i) the light emitting surface is far away from the light sources and (ii) the light amount from the light sources becomes less, it is possible for the light emitting surface to emit light having intensity substantially equal to light in a region close to the light sources. Therefore, evenness of brightness can be further improved.

The present invention has an arrangement in which the directions in which the light sources emit the light are parallel to the light emitting surface of the light guiding body. Even with such an arrangement, when the light sources are provided inside a surface of the light guiding body, there are some cases where the regions directly above the light sources are brighter than the other regions, as illustrated in FIGS. 5 and 7.

In view of the circumstances, it is preferable to provide taper surfaces 7d (light shielding means) for shielding direct light emitted from the light sources 5 to the light emitting surface 7a in regions (referred to as light source providing regions) directly above the light sources 5 (see FIG. 11).

In the present invention, the light shielding means is not limited to the taper surfaces 7d, and can be a shielding member such as a mask generally used to shield light, white ink printing, and metal printing such as A1.

Note that the taper surfaces 7d or other shielding members can be provided not only in the light source providing regions, but also in the vicinity of the light source providing regions into which the light emitted from the light sources directly enter. In other words, the taper surfaces or other light shielding members can be provided not only in the regions directly above the light sources 5 but also in other regions (in the vicinity of the above regions) obliquely above the light sources 5, in the light emitting surface 7a. This prevents the light emitted from the light sources from directly entering the light emitting surface more successfully.

As set forth above, the backlight 2 of the present embodiment can be constituted by combining a plurality of light emitting elements 11 illustrated in FIG. 3. In such a case where the backlight 2 is constituted by combining a plurality of light emitting elements 11, the backlight 2 preferably includes a drive section (not illustrated) for driving each of the light emitting elements 11 independently. Such an arrangement makes it possible to control the intensity of light emission for each of the light emitting elements 11. Therefore, it becomes possible to control the intensity of the backlight 2 for each region in accordance with each display region of the liquid crystal display panel 3. It is possible to carry out image display with higher contrast, when the drive section adjusts the light intensity of each of the light emitting elements such that the illumination intensity is low in a region where a blackish image is displayed, whereas is high in a region where a whitish image is displayed, for example.

A driving method for driving each light source 5 is not limited to the method of driving each of the light emitting elements independently. Instead, other various methods can be adopted. For example, it is possible to adopt a driving method of turning the light sources on for each of light source groups mounted on a single substrate 4. This allows the backlight to emit light line by line. In such a case where the backlight emits light line by line, and is driven as if it was scanned, it is possible to improve moving image response of the liquid crystal display panel 3. Thereby, it becomes possible to display moving images without blurs.

Further, an illumination device of the present invention may further include optical sensors or the like, such as photo diodes, inside the light guiding body. The sensor can be a color recognition sensor, a temperature sensor, or the like. Light sources, such as the LEDs, differ individually in light amount, or the like. The light amount of each of the light sources can be equalized by (i) attaching any one of the sensors described above to each light source, (ii) feeding back measured results found by the sensors to a drive circuit of the illumination device, and (iii) causing the drive circuit to adjust the light amounts based on the results. This can further improve brightness uniformity of the entire light emitting surface of the illumination device. Note that the present embodiment is not limited to this. It is possible to attach a single sensor for a plurality of the light sources.

Figure 15:
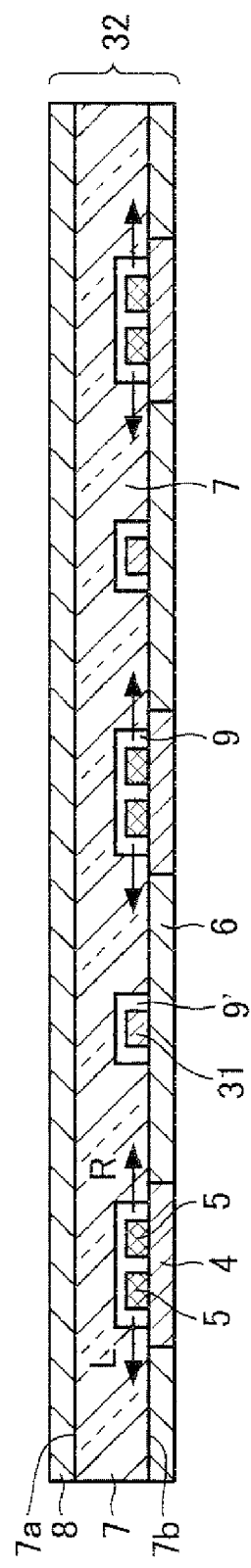
FIG. 15 is a cross-sectional view illustrating another example of a backlight in accordance with the present invention.

FIG. 15 illustrates an example of the backlight of the present invention, including sensors. A backlight (illumination device) 32, illustrated in FIG. 15, includes photo diodes (sensors) 31 which sense the light amounts of the light sources 5. The backlight 32 has the same arrangement as the backlight 2, illustrated in FIG. 1, except the sensor sections. Accordingly, the backlight 32 and the backlight 2 have the same reference numerals for the same members, and explanations regarding these are omitted here.

As illustrated in FIG. 15, photodiodes (sensors) 31 are provided in concave portions 9'. The concave portions 9' for the sensors 31 are provided in the light guiding body 7 of the backlight 31 so as to be between the concave portions 9 in which the light sources 5 are provided. The photo diode (sensors) 31 recognizes differences in luminance between each position, and then feed back the measured results to the drive circuit (not illustrated) of the backlight 32. The drive circuit thus adjusts the light amount of each of the light sources. In this way, the drive circuit equalizes the light amounts of respective of the light sources. Therefore, it becomes possible to obtain an illumination device which realizes brightness uniformity successfully in emitting light.

The light emitting elements 11 are combined in the grid pattern above. However, the present invention is not limited to this way. The following explains another example of a way of combining the light emitting elements.

Figure 12:
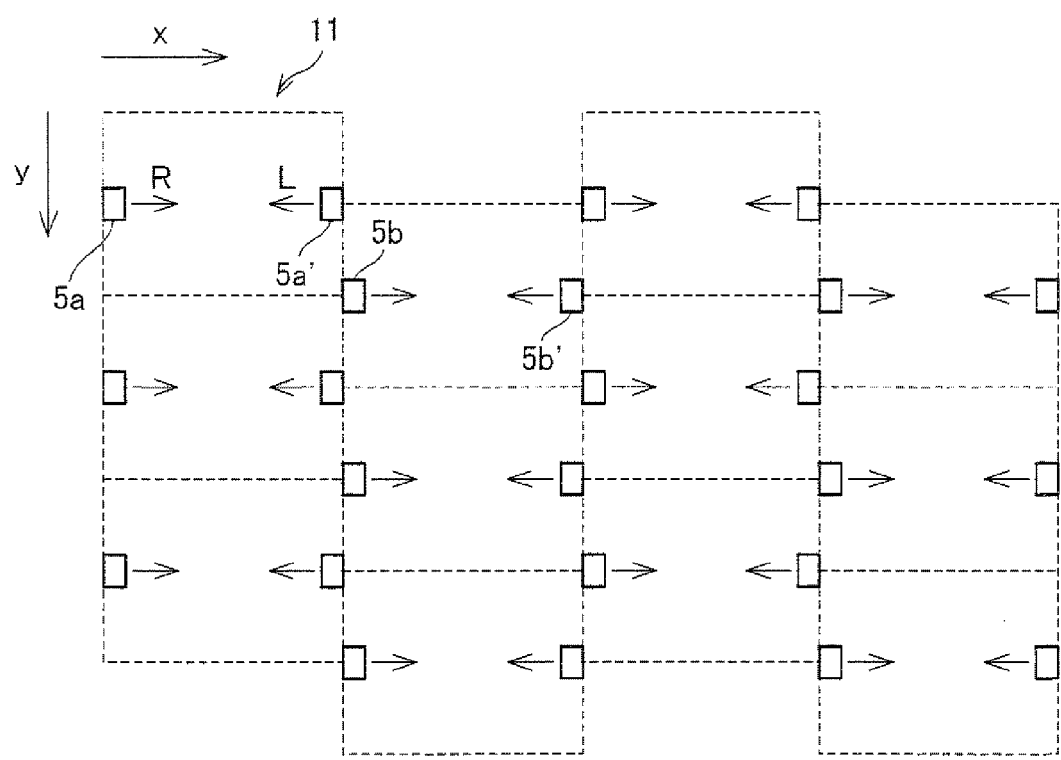
FIG. 12 is a plan view illustrating an example of a combination of light emitting elements.

In FIG. 12, a plurality of the light emitting elements 11, each of which has the aforementioned arrangement (see FIG. 3), is provided in a zigzag pattern in an x direction. That is, the light emitting elements 11 are combined such that the light source 5a' is located not to be close to the light source 5b in an x direction in adjacent two of the light emitting elements 11. Meanwhile, the light emitting elements 11 are aligned in a line in a y direction (see FIG. 2).

LEDs create heat when emitting light. An LED has a change in light emitting efficiency due to a change in temperature, although the change differs depending on a sort of the LED. Generally, an LED have a reduction in light emitting efficiency under an extremely high-temperature condition. For this reason, it is necessary to cause the LED to discharge heat for maintenance of the light emitting efficiency, provided that the LED is used as a light source. According to the arrangement, the light emitting elements are combined in the zigzag pattern in the x direction so that the plurality of the light sources are located not to be close to each other but located at certain intervals. Therefore, it is possible to improve heat discharge performance, and maintain the light emitting efficiency of the LED.

Figure 13:
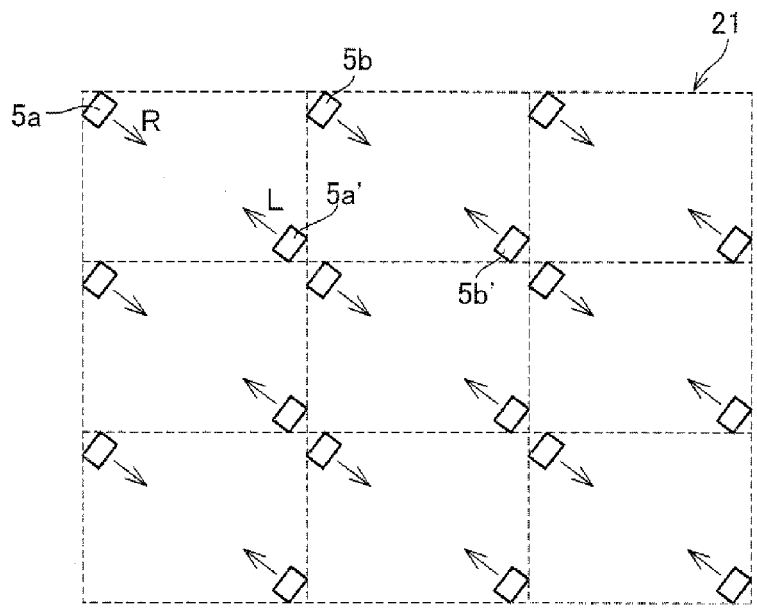
FIG. 13 is a plan view illustrating another combination of light emitting elements.

Further, FIG. 13 illustrates an example of another arrangement of the light emitting element of the present invention, and an example of a combination of the light emitting elements constituting a backlight.

As the light emitting element 11 illustrated in FIG. 3, a light emitting element 21 illustrated in FIG. 13 includes the two light sources 5a and 5a', and the light guiding body 7 for surface-emitting the light which has been emitted from the light sources. Each of the light sources 5a and 5a' is provided in the concave portion (not illustrated) inside the light guiding body 7, and faces each other. The directions, indicated by the arrows R and L, in which the light is emitted from each of the light sources 5a and 5a', are arranged to be parallel to the light emitting surface 7a of the light guiding body 7, so that one of the light sources emits light toward the other one of the light sources, and vice versa. According to the light emitting element 11, illustrated in FIG. 3, each of the light sources 5a and 5a' is provided in the vicinity of the center of a line of a substantially-square shape of the light guiding body 7, when viewed from directly above the light emitting element 11. However, according to the light emitting element 21, illustrated in FIG. 13, when viewed from directly above the light emitting element 21, the light sources 5a and 5a' are provided at diagonal corners of a substantially-square shape of the light guiding body 7, respectively.

Such positioning of the light sources 5a and 5a' prevents corner regions from becoming dark. Therefore, it is possible for an illumination device to have further uniform brightness.

As described above, two point light sources, which face each other, are provided at the diagonal corners of the light guiding body 7 in the light emitting element 21, respectively. This allows light emitted from the light sources to successfully irradiate the corner regions (the corner regions 12a, 12b, 12a', and 12b' illustrated in FIG. 10), where the light hardly reaches in a case where the light sources are provided in the vicinity of the centers of the lines of the light guiding body. Thus, it becomes possible to realize a light emitting element which is more advantageous in brightness uniformity, and use efficiency of light. Further, by combining a plurality of the light emitting elements 21, it becomes possible to realize a large backlight that is advantageous in brightness uniformity with no dark regions.

Figure 14:
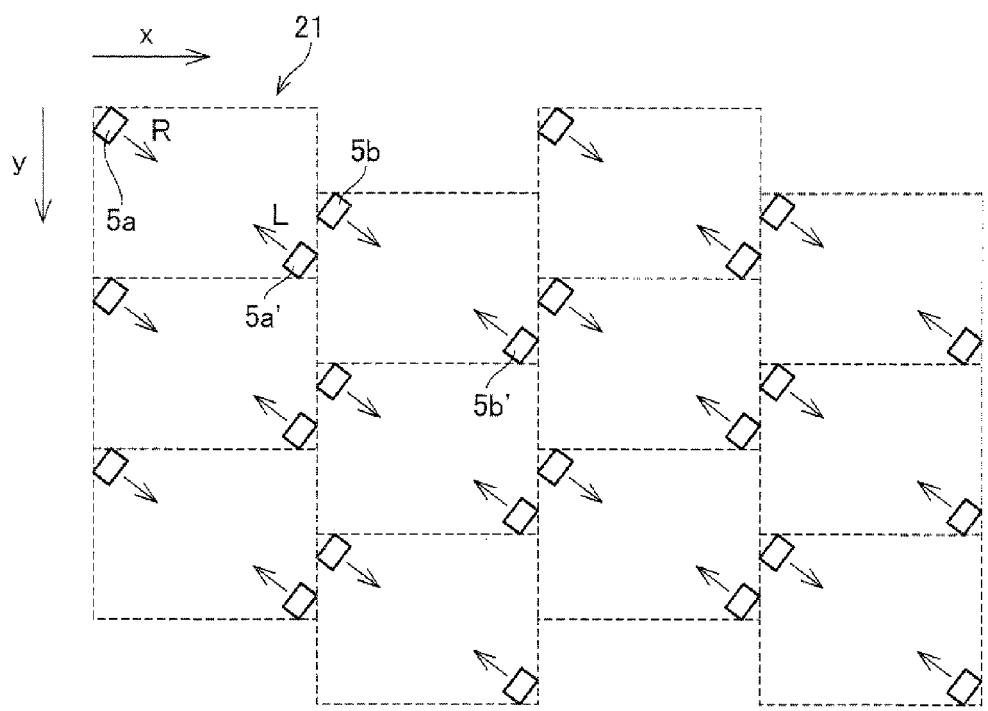
FIG. 14 is a plan view illustrating another example of a combination of the light emitting elements illustrated in FIG. 13.

FIG. 14 illustrates another example of a combination of the light emitting elements 21. The light emitting element, illustrated in FIG. 14, has the same arrangement as the light emitting element 21, illustrated in FIG. 13. In FIG. 14, however, the light emitting elements 21 are combined in a zigzag pattern in an x direction. That is, the light emitting elements 21 are combined such that the light source 5a' is located not to be close to the light source 5b in the x direction in adjacent two of the light emitting elements 21. Meanwhile, the light emitting elements 21 are aligned in a line in a y direction.

In a case where an LED is used as a light source, it is necessary to cause the LED to discharge heat. According to the arrangement in which the light emitting elements are provided in the zigzag pattern in the x direction, the plurality of the light sources are located not to be close to each other but located at certain intervals. Therefore, it becomes possible to improve heat discharge performance.

Thus, the light emitting elements of the illumination device of the present invention can be combined in the patterns described above. However, the present invention is not limited to these patterns. The two light sources included in the light emitting element may be arranged in any way as long as the two light sources emit the light in the directions different from each other. Further, a plurality of the light sources in the illumination device may be arranged in any way provided that at least two of the plurality of the light sources emit light in directions which are different from each other, in the illumination device. It is possible to arrange the light sources randomly (with no regularity).

The illumination device of the present invention is suitable for use in, especially, a liquid crystal display device having a large screen, because the illumination device is advantageous in brightness uniformity even in a case where the light emitting area becomes larger. The illumination device of the present invention, however, is not limited to this. The illumination device can be applied to any liquid crystal display devices as a backlight. Furthermore, the illumination device of the present invention is not limited to be applied to a liquid crystal display device. The illumination device can be applied to an interior illumination lump, an illumination lump for an exterior billboard, and the like.

The invention being thus described may be applied in many variations within the spirit of the present invention. The embodiments and concrete examples of implementation discussed in the foregoing detailed explanation serve solely to illustrate the technical details of the present invention, which should not be narrowly interpreted within the limits of such embodiments and concrete examples. The scope of the present invention is not limited by the description of the Specification but stated in the following claims. Further, modifications and variations within the spirit of the claims are encompassed in the scope of the present invention.

INDUSTRIAL APPLICABILITY

An illumination device of the present invention is suitable for use as a backlight of a liquid crystal display device. The illumination device of the present invention is, especially, suitable for use as a backlight of a large liquid crystal display device.

The invention claimed is:

1. A light emitting element comprising:
a plurality of light sources; and
a light guiding body for causing light emitted from the plurality of light sources to be surface-emitted, wherein:
concave portions, in which the plurality of light sources are provided, are provided on a bottom surface inside the light guiding body,
the plurality of light sources are side light emitting-type point light sources that each primarily emit light from their side surfaces which face side surfaces of the concave portions, respectively, so that said light sources each primarily emit light sideways, and
at least two of the plurality of light sources emit light in directions which are different from each other.

2. The light emitting element according to claim 1, wherein:
the plurality of light sources emit the light in directions along a light emitting surface of the light guiding body, from which light emitting surface light is emitted toward a light emitting target.

3. The light emitting element according to claim 1, wherein:
said at least two of the plurality of light sources (i) are provided so as to face each other, and (ii) emit the light so that one of the plurality of light sources emits light toward the other one of the plurality of light sources.

4. The light emitting element according to claim 1, wherein:
concavity and convexity are provided on the side surfaces of the concave portions, which side surfaces face light emitting surfaces of the plurality of light sources, respectively.

5. The light emitting element according to claim 1, wherein:
a light diffusing member for directing light to a light emitting surface of the light guiding body is provided on at least one of the light emitting surface of the light guiding body and an opposite surface of the light emitting surface.

6. The light emitting element according to claim 5, wherein:
the light diffusing member is concavity and convexity provided on the light emitting surface or the opposite surface, and density of the concavity and convexity in a region toward which light is emitted from a light source is different from the density in the other region.

7. The light emitting element according to claim 1, wherein:
the light guiding body becomes less in thickness as it is farther away from the light sources.

8. The light emitting element according to claim 1, wherein:
light shielding means for shielding light is provided in a region of a light emitting surface where the light emitting surface and respective of the plurality of light sources overlap each other.

9. The light emitting element according to claim 1, wherein:
the plurality of light sources are light emitting diodes.

10. An illumination device comprising: a light emitting element recited in claim 1, the light emitting surface irradiating a light emitting target with light.

11. The illumination device according to claim 10, wherein:
the light emitting element is plurally prepared and combined.

12. The illumination device according to claim 11, further comprising:
a drive section for driving the light emitting elements independently.

13. The illumination device according to claim 10, wherein:
the plurality of the light sources comprising:
a first light source group including a plurality of light sources which emit light in a first direction, and are provided in a line; and
a second light source group including a plurality of light sources which emit light in a second direction that is different from the first direction, and are provided so as to face the plurality of light sources of the first light source group, respectively.

14. The illumination device according to claim 10, wherein: sensors are provided inside the light guiding body.

15. A liquid crystal display device comprising an illumination device according to claim 10 as a backlight.

16. A liquid crystal display device comprising a light emitting element recited in claim 1, as a backlight.

* * * * *